US011893907B2

(12) United States Patent
Shamasundar et al.

(10) Patent No.: US 11,893,907 B2
(45) Date of Patent: Feb. 6, 2024

(54) SYSTEMS AND METHODS FOR EVIDENCE-BASED TRAINING OF AIRCRAFT OPERATORS

(71) Applicant: Honeywell International Inc., Morris Plains, NJ (US)

(72) Inventors: Raghu Shamasundar, Bangalore (IN); Mahesh Sivaratri, Bangalore (IN); Kalimulla Khan, Karnataka (IN); Srihari Jayathirtha, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 470 days.

(21) Appl. No.: 17/017,568

(22) Filed: Sep. 10, 2020

(65) Prior Publication Data
US 2021/0110731 A1 Apr. 15, 2021

(30) Foreign Application Priority Data
Oct. 14, 2019 (IN) .............................. 201941041446

(51) Int. Cl.
*G09B 9/08* (2006.01)
*B64D 45/00* (2006.01)

(52) U.S. Cl.
CPC ............... *G09B 9/08* (2013.01); *B64D 45/00* (2013.01); *B64D 2045/0085* (2013.01)

(58) Field of Classification Search
CPC ... G09B 9/08; B64D 45/00; B64D 2045/0085
See application file for complete search history.

(56) References Cited

U.S. PATENT DOCUMENTS

| 8,554,394 B2* | 10/2013 | Shamasundar ...... G08G 5/0052 |
| | | 701/4 |
| 8,784,107 B2* | 7/2014 | Testrake ................... G09B 9/08 |
| | | 434/30 |

(Continued)

FOREIGN PATENT DOCUMENTS

| CN | 1294510 C | 1/2007 | |
| EP | 3637386 A1 * | 4/2020 | ............. B64D 45/00 |
| EP | 3447750 B1 * | 3/2021 | ........... G08G 5/0013 |

OTHER PUBLICATIONS

Moro, Lara. "Evidence Based Training—Time to Change Traditional Pilot Training". Datascience.aero, Feb. 14, 2019. (5 pages, in English).

(Continued)

*Primary Examiner* — Xuan M Thai
*Assistant Examiner* — Sadaruz Zaman
(74) *Attorney, Agent, or Firm* — Alston & Bird LLP (57) ABSTRACT

Systems and methods are disclosed for evidence-based training of aircraft operators. For example, a computer-implemented method may include: analyzing aircraft flight data indicative of actions performed by an aircraft operator in operating aircraft, to thereby determine an assessment of a performance of the aircraft operator in operating aircraft; based on the assessment, determining a training scenario to be presented to the aircraft operator via a training simulator as part of training for the aircraft operator; providing, to the training simulator, information indicative of the determined training scenario; receiving, from the training simulator, training flight data indicative of actions performed by the aircraft operator during a simulation of the scenario using the training simulator; and based on the training flight data and the assessment, determining an evaluation of the training for the aircraft operator.

20 Claims, 4 Drawing Sheets

(56) References Cited

U.S. PATENT DOCUMENTS

| | | | | |
|---|---|---|---|---|
| 9,712,553 B2* | 7/2017 | Nguyen | ................... | B64F 5/60 |
| 9,836,990 B2* | 12/2017 | Nguyen | ................ | G09B 9/085 |
| 10,102,773 B2* | 10/2018 | Towers | ................ | G09B 19/14 |
| 10,242,580 B2* | 3/2019 | Groden | .................. | B64C 13/16 |
| 10,414,484 B2* | 9/2019 | Moxon | .................... | B64C 3/52 |
| 10,453,351 B2* | 10/2019 | Choi | ...................... | G05D 1/106 |
| 10,534,359 B2* | 1/2020 | Dong | ................ | G05B 23/0283 |
| 10,656,643 B1* | 5/2020 | Bertram | ................ | B64D 45/00 |
| 10,755,591 B2* | 8/2020 | Correia Gracio | ........ | G09B 9/08 |
| 11,030,664 B2* | 6/2021 | Chaubey | .............. | G08G 5/0052 |
| 11,151,810 B2* | 10/2021 | Ryan | .................. | G05B 23/0232 |
| 11,598,880 B2* | 3/2023 | Lu | ........................ | G05B 23/024 |
| 2016/0358498 A1* | 12/2016 | Fucke | ...................... | G09B 9/16 |
| 2018/0079495 A1* | 3/2018 | Jayathirtha | ............ | B64D 45/00 |
| 2018/0165979 A1* | 6/2018 | Correia Gracio | ............ | G06Q 10/06398 |
| 2020/0388194 A1* | 12/2020 | Sivaratri | .............. | G09B 19/165 |
| 2021/0033637 A1* | 2/2021 | Moore | ...................... | G01P 5/00 |

OTHER PUBLICATIONS

Read, Bill. "Training for the New Millenium". Royal Aeronautical Society, Oct. 27, 2017. (25 pages, in English).

\* cited by examiner

SYSTEMS AND METHODS FOR EVIDENCE-BASED TRAINING OF AIRCRAFT OPERATORS

CROSS-REFERENCE TO RELATED APPLICATION(S)

This patent application claims the benefit of priority under 35 U.S.C. § 119 from Indian Patent Application No. 201941041446, filed on Oct. 14, 2019, the contents of which is incorporated by reference in its entirety.

TECHNICAL FIELD

Various embodiments of the present disclosure relate generally to systems and methods for training for aircraft operators and, more particularly, to systems and methods for providing and evaluating evidence-based training for aircraft operators.

BACKGROUND

Evidence-based training (EBT) may be used for training and assessing aircraft operators based on evidence on their competencies. For example, evidence-based training may be used to identify, develop, and evaluate key competencies required by pilots to safely, effectively, and efficiently operate in commercial air transport environments. Evidence-based training may therefore play a role in managing relevant threats and errors. In order to implement evidence-based training, there is a need for systems and methods that are capable of effectively utilizing sources of evidence, such as flight data analysis (FDA), that may serve as the basis for the evidence-based training.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for evidence-based training of aircraft operators.

For example, a computer-implemented method may include: analyzing aircraft flight data indicative of actions performed by an aircraft operator in operating aircraft, to thereby determine an assessment of a performance of the aircraft operator in operating aircraft; based on the assessment, determining a training scenario to be presented to the aircraft operator via a training simulator as part of training for the aircraft operator; providing, to the training simulator, information indicative of the determined training scenario; receiving, from the training simulator, training flight data indicative of actions performed by the aircraft operator during a simulation of the scenario using the training simulator; and based on the training flight data and the assessment, determining an evaluation of the training for the aircraft operator.

Furthermore, a computer system may include a memory storing instructions and one or more processors configured to execute the instructions to perform operations. The operations may include: analyzing aircraft flight data indicative of actions performed by an aircraft operator in operating aircraft, to thereby determine an assessment of a performance of the aircraft operator in operating aircraft; based on the assessment, determining a training scenario to be presented to the aircraft operator via a training simulator as part of training for the aircraft operator; providing, to the training simulator, information indicative of the determined training scenario; receiving, from the training simulator, training flight data indicative of actions performed by the aircraft operator during a simulation of the scenario using the training simulator; and based on the training flight data and the assessment, determining an evaluation of the training for the aircraft operator.

Furthermore, a non-transitory computer-readable medium may store instructions that, when executed by one or more processors of a computer system, cause the computer system to perform a method for evidence-based training of aircraft operators. The method may include: analyzing aircraft flight data indicative of actions performed by an aircraft operator in operating aircraft, to thereby determine an assessment of a performance of the aircraft operator in operating aircraft; based on the assessment, determining a training scenario to be presented to the aircraft operator via a training simulator as part of training for the aircraft operator; providing, to the training simulator, information indicative of the determined training scenario; receiving, from the training simulator, training flight data indicative of actions performed by the aircraft operator during a simulation of the scenario using the training simulator; and based on the training flight data and the assessment, determining an evaluation of the training for the aircraft operator.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, systems and methods of the present disclosure may provide evidence-based training (EBT) to aircraft operators based on flight data analysis (FDA) and pilot training. A computer system, such as an FDM system, may correlate FDA statistics (e.g., statistics pertaining to safety and operational considerations of relevant events) to relevant training competencies. The computer system may then identify scenarios for training using line-operations scenarios. The effectiveness of the training may be evaluated by monitoring the training performed in a training simulating and detecting any exceedances or violations based on standard procedure during execution of the training scenario.

Figure 1:
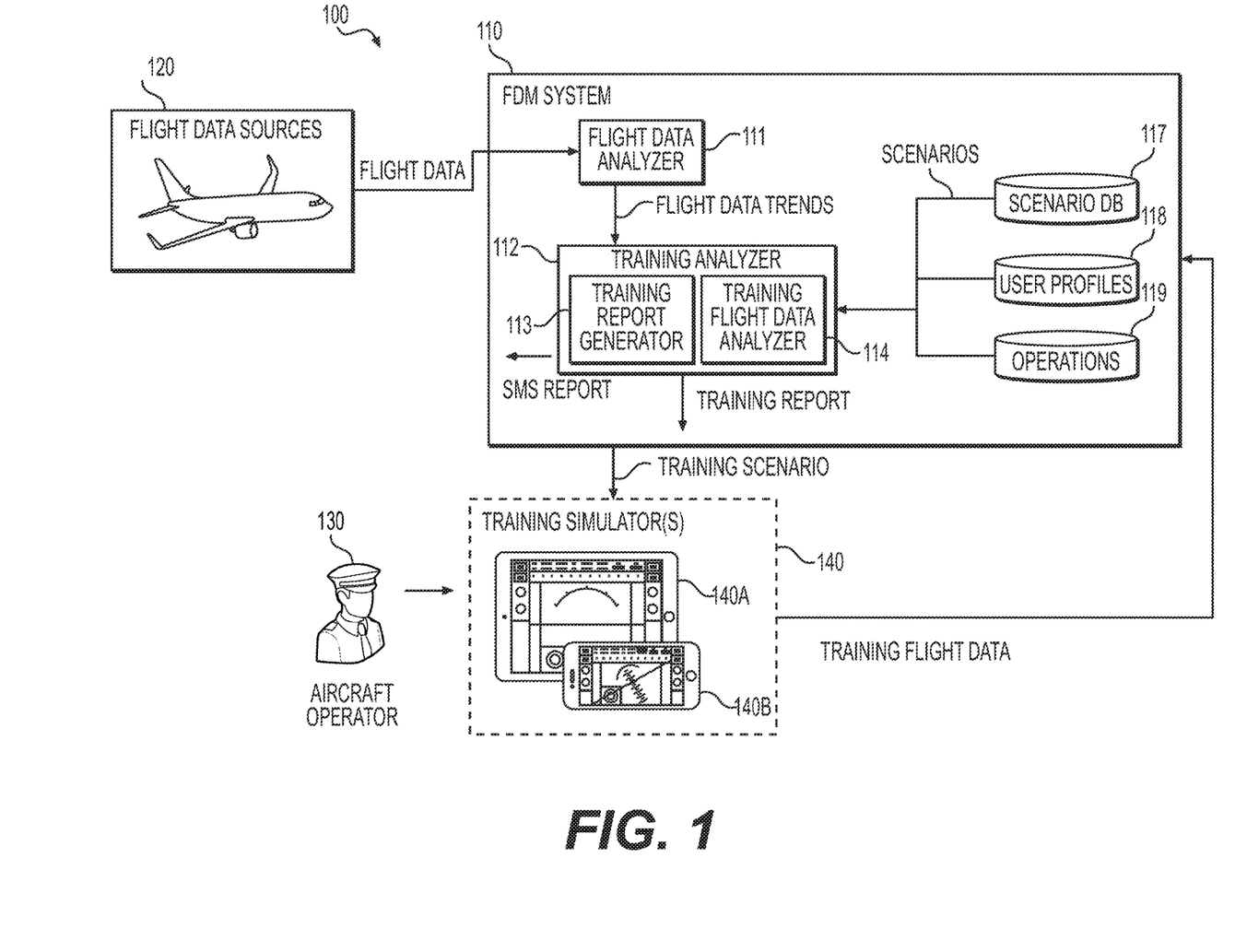
FIG. 1 depicts a system environment for evidence-based training of aircraft operators, according to one or more embodiments.

FIG. 1 illustrates a system environment 100 for evidence-based training. System environment 100 may include a flight data monitoring (FDM) system 110, flight data sources 120, an aircraft operator 130, and one or more training simulators 140.

Aircraft operator 130 may be, for example, a pilot or other flight crew member who uses training simulator(s) 140 to access a training program. The training program may include one or more training scenarios that can be simulated on training simulator(s) 140. FDM system 110 may be configured to select or otherwise determine the training scenarios of the training program. In this disclosure, the term "training program" may be used interchangeably with "training course."

Although one aircraft operator 130 is shown in FIG. 1, it is understood that system environment 100 may include a plurality of such aircraft operators, each associated with one or more respective training simulators in the manner described for aircraft operator 130 and training simulator(s) 140.

Since aircraft operators (e.g., aircraft operator 130) may utilize FDM system 110 for training purposes, aircraft operators may also be referred to as users of FDM system 110. FDM system 110 may include a user profile database 118 storing information pertaining to various aircraft operators that may utilize FDM system 110. FDM system 110 may use information stored in user profile database 118 to track the training individual users.

Flight data monitoring (FDM) system 110 may be a computer system that includes a memory storing instructions and one or more processors configured to execute the instructions to perform various functionalities described in this disclosure. FDM system 110 may be a computer system of any suitable type. For example, in some embodiments, FDM system 110 may be a server system having a cloud computing platform with scalable resources for computations and/or data storage, and may run one or more applications on the cloud computing to perform functionalities described in this disclosure.

FDM system 110 may be configured to analyze flight data received from flight data sources 120. Flight data sources 120 may include any system that provides flight data to FDM system 110. For example, flight data sources 120 may include a flight data recording system of an aircraft that records the actions of aircraft operators (e.g., aircraft operator 130) during a flight. Examples of flight data recording systems include quick access recorders (QAR), flight data recorders (FDR), cockpit voice recorders (CVR), datalink recorders (DLR), and cockpit voice and data recorders (CVDR). Data recorded by a flight data recording system may be transmitted to FDM system 110 through a communication network connecting between the aircraft and the computer system 110. Such a communication network may include, for example, satellite communications, and/or air-to-ground communications, and/or Wi-Fi communications. Flight data sources 120 may additionally or alternatively include ground-based computer systems that possess flight data, such as server systems belonging to data centers or air traffic controllers. In this disclosure, flight data from the operation of aircraft may also be referred to as aircraft flight data.

FDM system 110 may perform flight data analysis (FDA) on flight data received from flight data sources 120. Flight data analysis may be performed by flight data analyzer 111, which may be a software component of FDM system 110. Flight data analyzer 111 may analyze flight data received from flight data sources 120 to determine flight data trends. Flight data trends may pertain to events, exceedances, and/or incidents. For example, flight data trends may include statistical trends on such events, exceedances, and/or incidents. Statistical trends may be indicative of, for example, a rating of competency of one or a plurality of aircraft operators for each of a plurality of competencies in operating aircraft (e.g., the competencies shown in Table 1 below), and changes (e.g., improvements or degradations) in competency ratings. A competency rating, for any of the plurality of competencies, may be time-indexed such that a value of that competency rating may be associated with a point in time. For example, the statistical trends may indicate that the competency, for one or more of the plurality of competencies, is presently low (or high), or has degraded (or improved) as compared to an earlier point in time.

In this disclosure, the term "competency" may refer to any combination of knowledge, skills and/or attitudes required to perform a task to a predetermined operator standard. The predetermined standard may be arbitrarily determined based on the needs of the training program, the organization to which aircraft operator 130 belongs, and/or regulation.

Flight data analyzer 111 may measure trends in improvements and/or degradations in the operational performance of an aircraft operator (e.g., aircraft operator 130) or of a plurality of aircraft operators. Such improvements and degradations may be measured in terms of risk events defined by the flight data analysis process.

Flight data analysis performed by FDM system 110 may serve as a source of evidence for evidence-based training. For example, based on the flight data trends determined by flight data analyzer 111, an evidence-based training program for a particular aircraft operator or group of aircraft operators may be created or modified to mitigate risks revealed by the trends uncovered by the flight data analysis. As flight data analyzer 111 continues to determine trends, the effectiveness of the adjustments may be measured and validated in a quality loop process.

An evidence-based training program for an aircraft operator may include one or more training scenarios. Scenarios of a training program may be selected or identified based on flight data trends, as described above, and any other information available to FDM system 110. Training simulator(s) 140 may be configured to simulate such scenarios. For example, a scenario may present a high-risk situation for training purposes, and the simulation of the scenario using training simulator(s) 140 may permit an aircraft operator to fly the scenario in a simulation setting in which the aircraft operator may react to the high-risk situation for purposes of training. Where context permits, a scenario may also be generally referred to as a topic or a training topic.

Table 1 below shows examples of scenarios that may be part of an evidence-based training module. As shown in Table 1, a scenario may be associated with one or more competencies in operating aircraft. For example, the first scenario listed in Table 1 is associated with the competencies of "application of procedures" and "flightpath management—manual control." In the context of scenarios, an associated competency may be, for example, a competency on which the scenario provides training. Additionally or alternatively, the associated competency may be a competency that is measured for aircraft operator 130 when aircraft operator 130 performs the scenario using training simulator(s) 140. In Table 1 "flightpath management—manual control" may refer to flightpath management using manual control, and "flightpath management—automation" may refer to flightpath management using automation.

TABLE 1

| Scenario | Category | Scenario Features | Associated Competencies |
| --- | --- | --- | --- |
| 1 | Rejected take-off | Engine failure after the application of take-off thrust and before reaching V1 | Application of procedures; Flightpath Management - Manual control |
| 2 | Failure of critical engine between V1&V2 | Failure of critical engine from V1 and before reaching V2 in the lowest CAT 1 visibility conditions | Application of procedures; Flightpath Management - Manual control |
| 3 | Failure of critical engine between V1&V2 | Failure of critical engine from V1 and before reaching V2 in the lowest CAT 1 visibility conditions | Application of procedures; Flightpath Management - Manual control |
| 4 | Emergency descent | Initiation of emergency descent from normal cruise altitude | Application of procedures; Flightpath Management - Manual control; Flightpath Management - Automation |
| 5 | Engine-out approach & go-around | With a critical engine failed, a manually flown normal precision approach to DA, followed by a manually flown go-around, the whole maneuver to be flown without visual reference | Application of procedures; Flightpath Management - Manual control |
| 6 | Go-around | Go-around with all engines operative | Application of procedures; Flightpath Management - Manual control; Flightpath Management - Automation |
| 7 | Go-around | Go-around with all engines operative, followed by a visual circuit, manually flown | Application of procedures; Flightpath Management - Manual control; Flightpath Management - Automation |
| 8 | Go-around | Go-around with all engines operative | Application of procedures; Flightpath Management - Manual control; Flightpath Management - Automation |
| 9 | Engine-out landing | Normal landing with a critical engine failed | Application of procedures; Flightpath Management - Manual control |

Scenarios may be stored in a scenario database 117 of FDM system 110. Scenario database 117 may store any relevant data pertaining to scenarios, such as the identifier, category, scenario features, and associated competencies of a certain scenario. In this disclosure, the term "evidence-based training module" may be used to refer to the set of available scenarios stored in scenario database 117 and the competencies associated with the available scenarios.

Training simulator(s) 140 may include any computer system that is configured to providing training to an aircraft operator by performing simulation of aircraft systems. As described above, training simulator(s) 140 may perform simulations of training scenarios for aircraft operator 130. A simulation of a training scenario may provide the aircraft operator 130 with the ability to manipulate simulated aircraft controls to fly the aircraft in a simulated flight.

When a scenario is simulated on training simulator(s) 140, the training simulator(s) may simulating features defined in the scenario in an appropriate context (e.g., during a simulated flight). For example, scenario 1 of Table 1 has a feature of "Engine failure after the application of take-off thrust and before reaching V1," which may be simulated by training simulator(s) 140 as part of a simulated flight).

Examples of computer systems that may serve as a training simulator include mobile computing devices such as tablets (e.g., tablet 140A) and smartphones (e.g., smartphone 140B), laptop and desktop personal computers, and flight simulators having peripherals specialized for simulation. In some examples, a training simulator may be a general purpose computer that executes one or more applications installed thereon to provide simulation. For example, tablet 140A and 140B may be general purpose devices that have a simulator program installed thereon. However, it is also possible for the computer system to be a professional flight simulator that simulates the cockpit environment and flight environment. Such flight simulators may be full flight simulators and full motion flight simulators, and may have peripherals specialized for flight simulation.

Training simulator(s) 140 may present training scenarios to aircraft operator 130 based on data received from FDM system 110. For example, FDM system 110 may provide data describing training scenarios to be simulated on training simulator(s) 140 for purposes of training. Such data may describe the scenario features of training scenarios, such as the scenario features those shown in Table 1. Alternatively or additionally, such training scenarios may already be installed on training simulator(s), and FDM system 110 may identifying the training scenarios for simulation for purposes of training. Training simulator(s) 140 may receive data from and transmit data to FDM system 110 via any suitable communication network, such as a public network (e.g., the Internet), a local network, and/or other network.

The scenarios shown in Table 1 may be part of an evidence-based training program used by a training department of an airline for conducting recurrent training of aircraft operators. In some circumstances, it may possible for the scenarios of a training program to be manually selected. For example, to arrive at a set of scenarios such as the set shown in Table 1, a training captain or other airline personnel may use the aforementioned flight data trends, or other statistical reports derived from flight data analysis, to identify high-risk events observed in line-operations and the corresponding competencies, and may then select scenarios that pertain to the identified high-risk events. It is also possible for training scenarios to be standardized. That is, the scenarios may be a fixed set of scenarios for all aircraft operators of an airline or other organization.

In comparison with a manual selection process, FDM system 110 may improve the selection of scenarios for the training program of an aircraft operator, or group of aircraft operators. For example, FDM system 110 may be configured to identify specific scenarios for training based on flight data and training flight data, so that an aircraft operator may receive training in specific scenarios rather than a set of standardized scenarios. Furthermore, while it may be possible to have an instruction oversee the training of aircraft operators to assess their competencies, FDM system 110 may also perform such a role by being configured to evaluate flight training using training simulator(s) 140.

FDM system 110 may include a training analyzer 112 configured to identify training needs based on information available to the FDM system, and evaluate the effectiveness of the training. Training analyzer 112 may be implemented as one or more software components executed by the FDM system 110, and may include a training report generator 103 and a training data analyzer 104, as described below. Training report generator 103 and training data analyzer 104 may each be a program or software component that is execute on FDM system 110.

Training report generator 113 may be configured to map flight data trends to a set of competencies of an evidence-based training module. For example, the flight data trends may describe trends pertaining events, exceedances, and incidences, and the set of competencies may be the set shown in Table 1 (which includes "application of procedures," "flightpath management—automation," and "flightpath management—manual control"). The mapping of flight data trends to competencies may include, for each particular competency in the set of competencies, identifying information included in the flight data trends that is relevant to the particular competency, and, if relevant information has been identified, determining an assessment of that particular competency for one or more aircraft operators (e.g., aircraft operator 130 or a plurality of aircraft operators) based on the relevant information.

In some examples, the flight data trend may be determined from flight data pertaining to aircraft operator 130 (e.g., flight data obtained from aircraft having been flow by operator 130), in which case the mapping of the flight data trends to the competencies may determine competency ratings of operator 130 for each competency in the set of competencies. In such examples, the flight data trend may be personal to aircraft operator 130. In additional examples, the flight data trend may be determined from flight data pertaining to a plurality of aircraft operators (e.g., a group of aircraft operators within an airline), in which case the mapping of the flight data trends to the competencies may determine a competency rating of the plurality of aircraft operators in the aggregate for each competency in the set of competencies.

Training report generator 113 may identify competencies for which improvement is needed for aircraft operator 130 or the plurality of aircraft operators, so as to require the competencies to be re-visited during training. Training report generator 113 may generate a report indicative of such competencies that need to be re-visited during training.

For each of the competencies that need to be re-visited during training, training report generator 113 may determine the training scenario(s) to be presented to the operator 130 or plurality of aircraft operators as part of training. Such training scenarios may selected from pre-defined training scenarios that are stored in scenario database 117 as part of the evidence-based training module, and may be selected based on the flight data trends, and/or the associated flight data used to generate the flight data trends.

In some embodiments, the flight data trends and/or the associated flight data may indicate a training scenario characteristic, and training report generator 113 may select a scenario from scenario database 117 having the determined training scenario characteristic. Training report generator 113 may have access to the flight data used by flight data analyzer 111. For example, training report generator may process the flight data to determine the training scenario characteristic used for selection of training scenarios. In additional embodiments, it is possible for training report generator 113 to define a new scenario based on the training scenario characteristic. A training scenario characteristic may be, for example, a category of the training scenario, a scenario feature of the training scenario, and/or a competency associated with the training scenario.

The basis for selection of the training scenario may additionally or alternatively include line operations information. Line operations information, which may describe line operations of an airline, for example, may be stored in operations database 119 of FDM system.

The reports and associated scenarios may be filtered based on, for example, crew, aircraft type, aircraft tail number, and/or specific events (e.g., airline-wide events or industry-wide events). Additional filters may include event severity (high, medium, low), geographic region, and/or season etc. The report may indicate the FDM trends that triggered the competency gap for assessment and monitoring of the improvements in subsequent flights. Reports generated by training report generator 113 report may have any suitable format. For example, the report may be a set of data records that include parameter values indicative of competencies that need to be revisited during training. However, it is also possible for the report to be formatted for viewing by a human.

As described above, training may involve using training simulator(s) 140 to simulate the training scenarios determined by training report generator 113. After aircraft operator 130 has performed the training scenarios on training simulator(s) 140, training simulator(s) may provide training flight data indicative of actions performed during simulation of the training scenarios.

Training flight data analyzer 114 may be configured to analyze the training flight data received from training simulator(s) 140 to determine an evaluation of a performance of aircraft operator 130 in completing training scenarios simulated using training simulator(s) 140. The evaluation may be, for example, indicative of any events, exceedances and incidents. Training analyzer 112 may compare the training report generated by training report generator 113 and the evaluation determined by training flight data analyzer to determine an effectiveness of the training program. The results of the determination of the effectiveness of the training program may be provided to a safety management system (SMS) for corrective actions and monitoring of the corrective actions. The SMS may be separate from FDM system 110.

Figure 2:
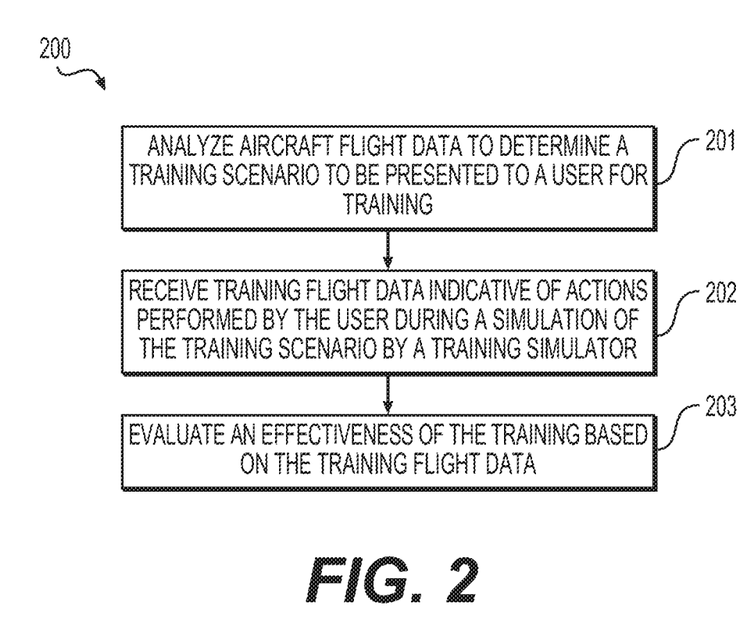
FIG. 2 depicts a flowchart of a method for evidence-based training of aircraft operators, according to one or more embodiments.

FIG. 2 depicts a method 200 for providing and evaluating evidence-based training, according to one or more embodiments. The method may be performed by any suitable computer system, such as FDM system 110 and may incorporate any of the techniques discussed above in relation to FIG. 1.

Step 201 may include analyzing aircraft flight data to determine a training scenario to be presented to a user for training. The user may be an aircraft operator, such as aircraft operator 130. Step 202 may include receive training flight data indicative of actions performed by the user during a simulation of the training scenario by a training simulator (e.g., flight simulator(s) 140). Step 303 may include evaluating an effectiveness of the training based on the training flight data. The evaluation in step 303 may be performed by training flight data analyzer 114, as described above in connection with FIG. 1.

Figure 3:
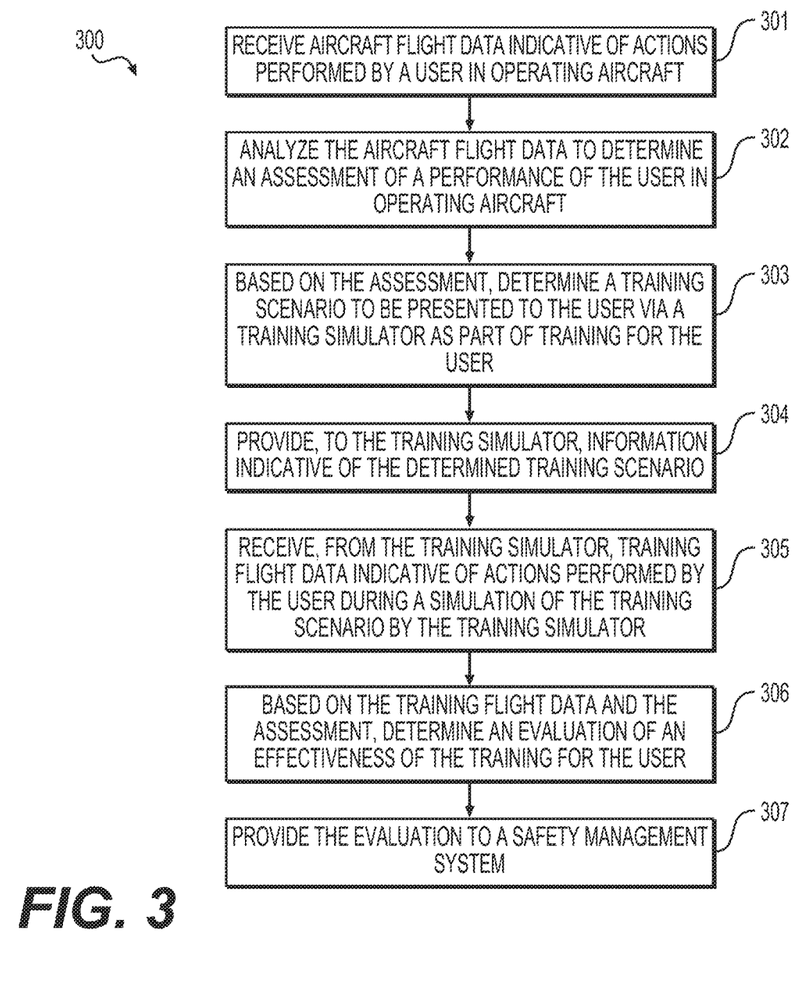
FIG. 3 depicts a flowchart of a method for evidence-based training of aircraft operators, according to one or more embodiments.

FIG. 3 depicts a method 300 for providing and evaluating evidence-based training, according to one or more embodiments. The method may be performed by any suitable computer system, such as FDM system 110 and may incorporate any of the techniques discussed above in relation to FIG. 1. In general, method 300 may be regarded as an exemplary implementation of the method 200 depicted in FIG. 2. In particular, steps 302 and 303 may be implemented as sub-steps of step 202 of method 200, and steps 305 and 306 are examples of steps 202 and 203, respectively.

Step 301 may include receiving aircraft flight data indicative of actions performed by a user in operating aircraft. The aircraft flight data may be received from flight data sources 120 in any of the manners described above in connection with FIG. 1. The user referred to in step 301 may be an aircraft operator, such as aircraft operator 130.

Step 302 may include analyzing the aircraft flight data to determine an assessment of a performance of the user in operating aircraft. The assessment of the performance of the user may be a training report indicative of a competency rating of the user for one or more competencies.

Step 302 may involve any of the techniques described in this disclosure. For example, step 302 may include analyzing (by using flight data analyzer 111, for example) the aircraft flight data to determine one or more flight data trends, and, based on the one or more flight data trends, determining (by using training report generator 113, for example) a competency rating of the aircraft operator for a competency in operating aircraft. The competency may be, for example, the application of procedures, flight path management using automation, or flight path management using manual control, as described above in connection with Table 1.

For example, step 302 may determine that the user does not have a sufficient competency rating for the aforementioned competency. For example, the flight data trends may reveal that the competency rating of the user may is currently below, or has dropped below, a predefined threshold serving as a minimal level of competency. In such a circumstance, the user may be said to have a deficiency or gap in the particular competency.

Step 303 may include determining, based on the assessment, a training scenario to be presented to the user via a training simulator as part of training for the user. In this context, "training for the user" may be, for example, a training course or training program provided by an airline. Continuing with the example presented for step 302, the training scenario selected in step 303 may be designed to improve the user's proficiency in the competency.

Step 303 may involve any techniques described above in this disclosure. For example, step 303 may include selecting the training scenario from a plurality of training scenarios stored in scenario database 117, each of which may be stored so as to be associated with one or more competencies in operating aircraft. Alternatively, step 303 may include constructing a new training scenario by, for example, defining training scenario parameters to define a scenario that would improve the user's proficiency in the competency.

Step 304 may include providing, to the training simulator, information indicative of the determined training scenario. The training simulator may be a training simulator represented by training simulator(s) 140 as described above. The information indicative of the determined training scenario may be in the form of data that enables the training simulator to simulate the training scenario for aircraft operator 130. For example, the data may include various values that define a flight environment and characteristics of a flight through the flight environment. Based on such data, the training simulator may permit the user to fly the scenario on the training simulator.

Step 305 may include receiving, from the training simulator, training flight data indicative of actions performed by the user during a simulation of the training scenario by the training simulator. The training flight data may have any suitable form or format.

Step 306 may include determining, based on the training flight data and the assessment, an evaluation of an effectiveness of the training for the user. For example, the determination may include determining, based on the training flight data, a second competency rating of the aircraft operator for the competency described above in connection with step 202. This second competency rating may then be compared with the first competency rating obtained in step 202 using the aircraft flight data. For example, if the second competency rating based on training flight data is greater than the first competency rating based on aircraft flight data, then the evaluation may include a determination that the competency of the user has improved as a result of the training. Otherwise, if the second competency rating based on training flight data is not greater than the first competency rating based on aircraft flight data, then the evaluation may include a determination that the competency of the user has not improved as a result of the training. The evaluation may also include a determining of whether the user requires additional training, based on, for example, whether the second competency level is at or above a threshold level of competency.

Step 307 may include providing the evaluation to a safety management system. Step 307 may be performed by transmitting data indicative of the evaluation to a computer system that is part of the safety management system.

In general, any method discussed in this disclosure that is understood to be computer-implementable, such as the method described in connection with FIG. 3, may be performed by one or more processors of a computer system, such as FDM system 110, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as FDM system 110, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

According to the techniques described above, it is possible to utilize flight data analysis to provide evidence-based training to an aircraft operator via a training simulator, and to evaluate the result of the training provided via the training simulator. In particular, the FDM system 110 described above may perform FDA statistical analysis against training competency gaps, develop training scenarios from the line-operations, and/or evaluate an effectiveness of the training.

Figure 4:
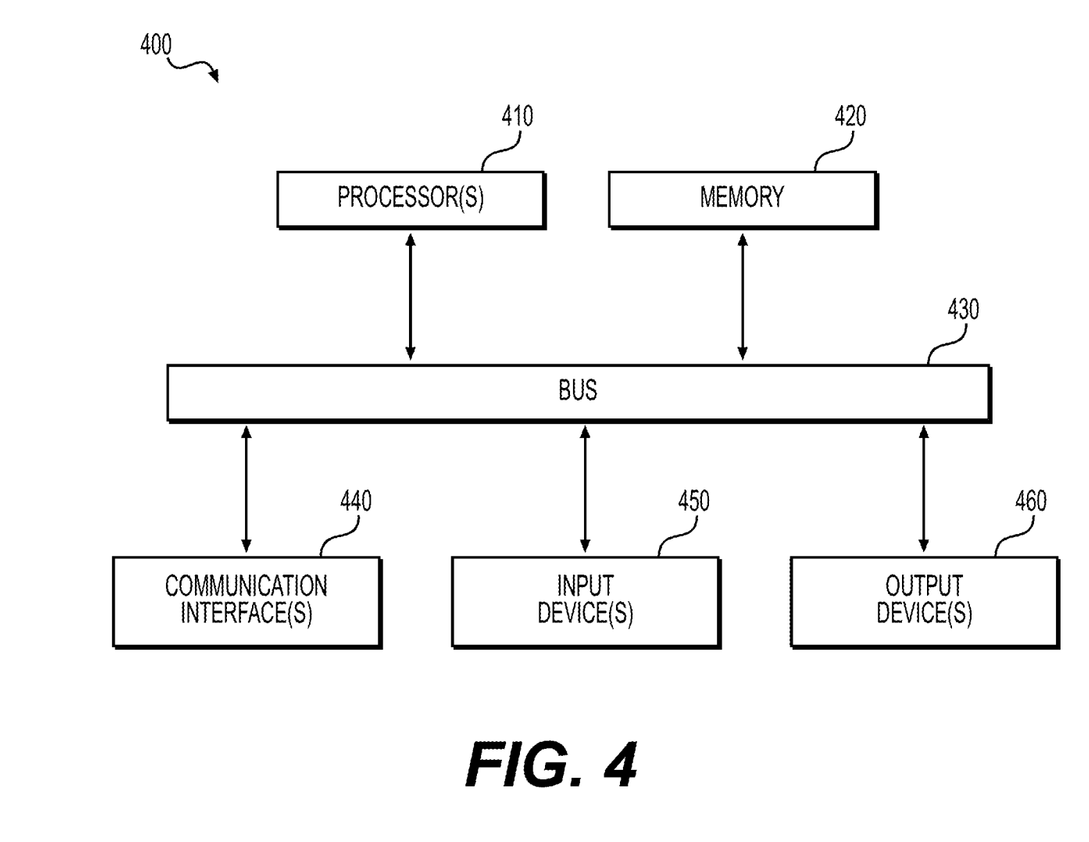
FIG. 4 depicts a computing device, according to one or more embodiments.

FIG. 4 illustrates an example of a computing device 400 of a computer system. The computing device 400 may include processor(s) 410 (e.g., CPU, GPU, or other processing unit), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for evidence-based training of aircraft operators, the method comprising:
   receiving, by a flight data monitoring system from one or more flight data sources separate from the flight data monitoring system, aircraft flight data indicative of one or more flight actions performed by an aircraft operator in operating aircraft during an actual flight of the aircraft, wherein the aircraft flight data is captured by the one or more flight data sources during the actual flight of the aircraft;
   upon receiving the aircraft flight data from the one or more flight data sources separate from the flight data monitoring system, analyzing, by the flight data monitoring system, the aircraft flight data indicative of the one or more flight actions performed by an aircraft operator in operating aircraft during the actual flight of the aircraft, to thereby determine an assessment of a performance of the aircraft operator in operating the aircraft during the actual flight of the aircraft, wherein the assessment is determined based at least in part on the aircraft flight data captured by the one or more flight data sources;
   based on the assessment, determining a training scenario to be presented to the aircraft operator via a training simulator as part of training for the aircraft operator, wherein the training simulator is separate from the aircraft, and wherein the training scenario is determined based at least in part on the aircraft flight data captured by the one or more flight data sources during the actual flight of the aircraft;
   providing, to the training simulator, information indicative of the determined training scenario;
   receiving, from the training simulator, training flight data indicative of one or more simulated actions performed by the aircraft operator during a simulation of the scenario using the training simulator, wherein the one or more flight actions and the one or more simulated actions define separate actions executed by the aircraft operator during the actual flight of the aircraft and the simulation using the training simulator, respectively; and
   based on the training flight data and the assessment, determining an evaluation of the training for the aircraft operator.

2. The method of claim 1, wherein the analyzing the aircraft flight data to thereby determine the assessment includes:
   analyzing the aircraft flight data to determine one or more flight data trends; and
   based on the one or more flight data trends, determining a competency rating of the aircraft operator for a competency in operating aircraft, the competency rating being included in the assessment.

3. The method of claim 2, wherein the determining the training scenario includes identifying the training scenario based on an association of the training scenario with the competency.

4. The method of claim 3, wherein the identifying the training scenario includes selecting the training scenario from a plurality of training scenarios, each of the plurality of training scenarios being associated with one or more competencies in operating aircraft.

5. The method of claim 3, wherein
   the competency rating is a first competency rating, and
   the determining the evaluation of the training includes
      based on the training flight data, determining a second competency rating of the aircraft operator for the competency, and
      comparing the first competency rating with the second competency rating to determine the evaluation.

6. The method of claim 1, further comprising:
   providing the evaluation of the training for the aircraft operator to a safety management system.

7. The method of claim 2, wherein the competency is application of procedures, flight path management using automation, or flight path management using manual control.

8. A computer system for evidence-based training of aircraft operators, the computer system comprising:
   a memory storing instructions; and
   one or more processors configured to execute the instructions to perform operations including:
      receiving, by a flight data monitoring system from one or more flight data sources separate from the flight data monitoring system, aircraft flight data indicative of one or more flight actions performed by an aircraft operator in operating aircraft during an actual flight of the aircraft, wherein the aircraft flight data is captured by the one or more flight data sources during the actual flight of the aircraft;
      upon receiving the aircraft flight data from the one or more flight data sources separate from the flight data monitoring system, analyzing, by the flight data monitoring system, the aircraft flight data indicative of the one or more flight actions performed by an aircraft operator in operating aircraft during the actual flight of the aircraft, to thereby determine an assessment of a performance of the aircraft operator in operating the aircraft during the actual flight of the aircraft, wherein the assessment is determined based at least in part on the aircraft flight data captured by the one or more flight data sources;
      based on the assessment, determining a training scenario to be presented to the aircraft operator via a training simulator as part of training for the aircraft operator, wherein the training simulator is separate from the aircraft, and wherein the training scenario is determined based at least in part on the aircraft flight data is captured by the one or more flight data sources during the actual flight of the aircraft;
      providing, to the training simulator, information indicative of the determined training scenario;
      receiving, from the training simulator, training flight data indicative of one or more simulated actions performed by the aircraft operator during a simulation of the scenario using the training simulator, wherein the one or more flight actions and the one or more simulated actions define separate actions executed by the aircraft operator during the actual flight of the aircraft and the simulation using the training simulator, respectively; and
      based on the training flight data and the assessment, determining an evaluation of the training for the aircraft operator.

9. The computer system of claim 8, wherein the analyzing the aircraft flight data to thereby determine the assessment includes:
   analyzing the aircraft flight data to determine one or more flight data trends; and
   based on the one or more flight data trends, determining a competency rating of the aircraft operator for a competency in operating aircraft, the competency rating being included in the assessment.

10. The computer system of claim 9, wherein the determining the training scenario includes identifying the training scenario based on an association of the training scenario with the competency.

11. The computer system of claim 10, wherein the identifying the training scenario includes selecting the training scenario from a plurality of training scenarios, each of the plurality of training scenarios being associated with one or more competencies in operating aircraft.

12. The computer system of claim 10, wherein
the competency rating is a first competency rating, and
the determining the evaluation of the training includes
based on the training flight data, determining a second competency rating of the aircraft operator for the competency, and
comparing the first competency rating with the second competency rating to determine the evaluation.

13. The computer system of claim 8, wherein the operations further include:
providing the evaluation of the training for the aircraft operator to a safety management system.

14. The computer system of claim 9, wherein the competency is application of procedures, flight path management using automation, or flight path management using manual control.

15. A non-transitory computer-readable medium storing instructions that, when executed by one or more processors of a computer system, cause the computer system to perform a method for evidence-based training of aircraft operators, the method including:
receiving, by a flight data monitoring system from one or more flight data sources separate from the flight data monitoring system, aircraft flight data indicative of one or more flight actions performed by an aircraft operator in operating aircraft during an actual flight of the aircraft, wherein the aircraft flight data is captured by the one or more flight data sources during the actual flight of the aircraft;
upon receiving the aircraft flight data from the one or more flight data sources separate from the flight data monitoring system, analyzing, by the flight data monitoring system, the aircraft flight data indicative of the one or more flight actions performed by an aircraft operator in operating the aircraft during the actual flight of the aircraft, to thereby determine an assessment of a performance of the aircraft operator in operating aircraft during the actual flight of the aircraft, wherein the assessment is determined based at least in part on the aircraft flight data captured by the one or more flight data sources;
based on the assessment, determining a training scenario to be presented to the aircraft operator via a training simulator as part of training for the aircraft operator, wherein the training simulator is separate from the aircraft, and wherein the training scenario is determined based at least in part on the aircraft flight data is captured by the one or more flight data sources during the actual flight of the aircraft;
providing, to the training simulator, information indicative of the determined training scenario;
receiving, from the training simulator, training flight data indicative of one or more simulated actions performed by the aircraft operator during a simulation of the scenario using the training simulator, wherein the one or more flight actions and the one or more simulated actions define separate actions executed by the aircraft operator during the actual flight of the aircraft and the simulation using the training simulator, respectively; and
based on the training flight data and the assessment, determining an evaluation of the training for the aircraft operator.

16. The non-transitory computer-readable medium of claim 15, wherein the analyzing the aircraft flight data to thereby determine the assessment includes:
analyzing the aircraft flight data to determine one or more flight data trends; and
based on the one or more flight data trends, determining a competency rating of the aircraft operator for a competency in operating aircraft, the competency rating being included in the assessment.

17. The non-transitory computer-readable medium of claim 16, wherein the determining the training scenario includes identifying the training scenario based on an association of the training scenario with the competency.

18. The non-transitory computer-readable medium of claim 17, wherein the identifying the training scenario includes selecting the training scenario from a plurality of training scenarios, each of the plurality of training scenarios being associated with one or more competencies in operating aircraft.

19. The non-transitory computer-readable medium of claim 17, wherein
the competency rating is a first competency rating, and
the determining the evaluation of the training includes
based on the training flight data, determining a second competency rating of the aircraft operator for the competency, and
comparing the first competency rating with the second competency rating to determine the evaluation.

20. The non-transitory computer-readable medium of claim 15, wherein the method further includes:
providing the evaluation of the training for the aircraft operator to a safety management system.

* * * * *